UNITED STATES PATENT OFFICE.

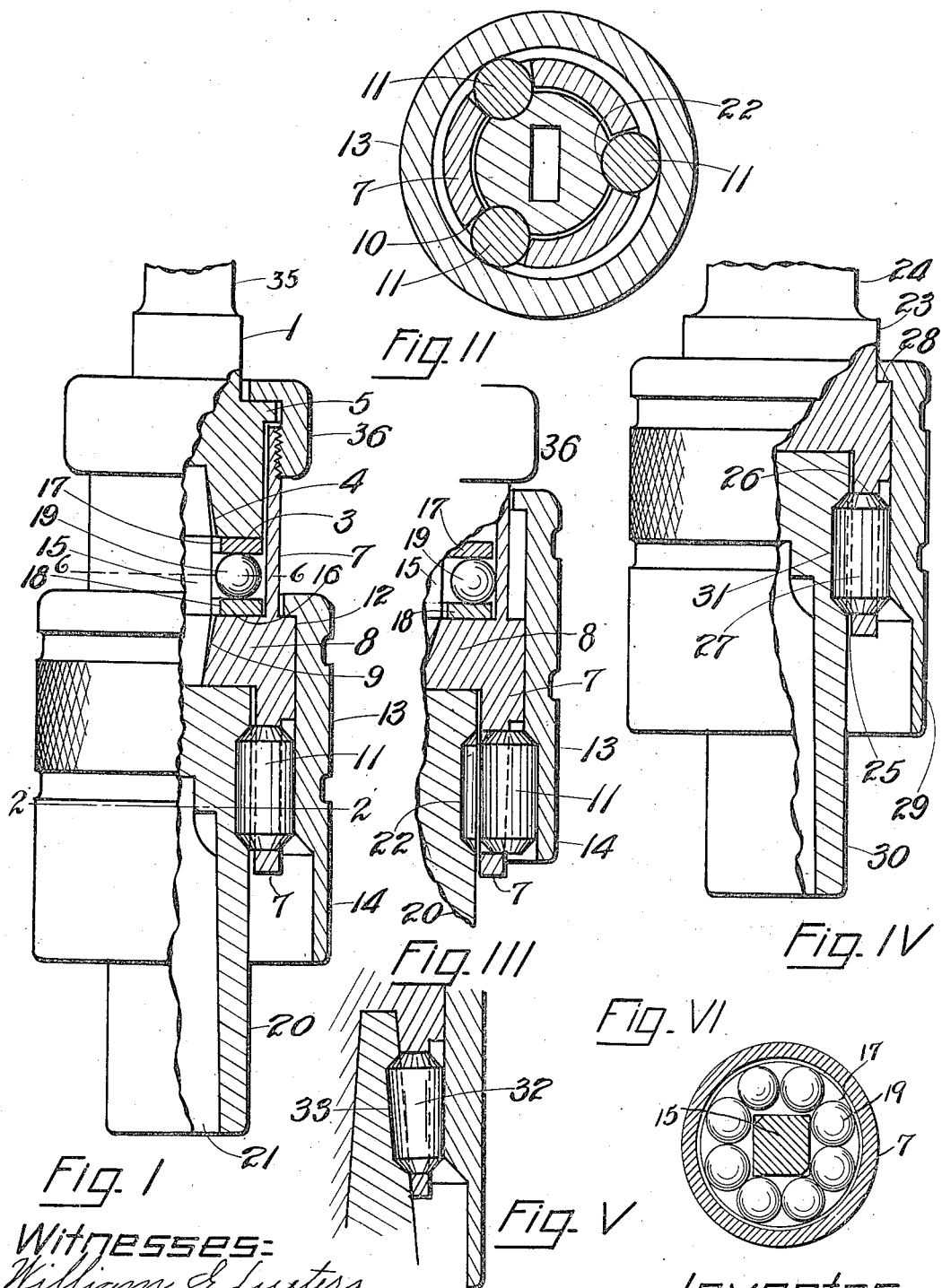

CHRISTIAN F. HEINKEL, OF CLEVELAND, OHIO.

CHUCK.

1,283,173.　　　　Specification of Letters Patent.　　Patented Oct. 29, 1918.

Application filed April 13, 1916. Serial No. 90,936.

*To all whom it may concern:*

Be it known that I, CHRISTIAN F. HEINKEL, a citizen of the United States, residing at Cleveland, in the county of Cuyahoga and State of Ohio, have invented a new and useful Chuck, of which the following is a specification.

My invention relates to chucks which permit of the insertion and removal of a tool while the chuck is in motion and in which the tool may be held floatingly.

The object of my invention is to provide a chuck which is economical of manufacture, efficient in operation, and which does its work better than heretofore.

I attain this object by the mechanism illustrated in the accompanying drawings in which Figure I is a general side view of a chuck, partly broken away to show interior elements and the rolls in gripping position; Fig. II is a section on line 2—2 of Fig. I; Fig. III is a partial section of the chuck showing the rolls in their outer or release position; Fig. IV is a modification of Fig. I showing a chuck without floating means; Fig. V is a partial section of a chuck showing the modification of gripping a tool directly by the rolls, and Fig. VI is a section on line 6—6 of Fig. 1.

Similar reference characters refer to similar parts throughout the several views.

It is known that chucks have been patented and made of a nature similar to this invention, but such chucks generally employ balls for gripping members and are short lived generally. These chucks wear out quickly since the gripping members have a spherical surface and the wearing and contact surface is very small; the seat for these balls on the socket is hard to produce since it must be round in all directions; when such a chuck is in use the balls press outwardly against the outer sleeve with considerable force and, since such balls bear against this outer sleeve at a point only, will wear or press a hollow into the wall of the sleeve which will render the chuck useless in a comparatively short time. Flat plugs or keys have also been tried and better results have been attained therewith than with balls but these keys have a tendency to stick (there being no rolling action) particularly after such a chuck has been in use a short time and considerable pounding and hammering is often found necessary to release a tool from such a chuck. Another disadvantage of these chucks is the frequent repairs made necessary by the burring of the edges of the slots which is caused by the action of the flat keys thereon. Furthermore, none of the chucks heretofore made have proper floating means or rather have provision for proper floating which is an important factor in up-to-date production. The float formerly provided is not a proper float since it permits the tool to merely wiggle in the holder whereas a proper float should permit the tool to move radially only in all directions but the axes of the tool and the tool holder should always be parallel with the axis of the work or the work holder device. It is almost impossible to find a machine in which the work holding spindle or device is not out of alinement with the tool holding device, but it is generally found that the axes of these devices are parallel with each other. Now if a reamer for instance which is held by the old floating means is employed on such a machine, the reamer will be fed through the hole to be reamed at an angle and the result will be a taper hole, whereas if this reamer were mounted on a proper floating means, the axis of the hole and the axis of the reamer would always be in alinement although the axis of the hole and the axis of the reamer holder or spindle may be out of alinement and the reamer would ream a true and straight hole which is very necessary not only for present-day production but also for good work.

The present invention aims to overcome the difficulties and disadvantages found in similar chucks now made by introducing rolls instead of balls or plugs or keys as gripping members and by arranging and combining the several elements substantially as shown although I am aware that various other forms and combinations can be devised which embody the spirit and intent of the present invention.

In carrying out my invention in connection with the chuck shown in the drawings, I prefer to form the body 1 with a suitable shank 35 on one end, with a substantially flat surface 3 and the square and taper opening 4 at the other end, and the collar 5 intermediate both ends as best seen in Fig. I.

Over the collar 5 fits the support ring 36 which is threaded internally to receive the driving sleeve 7 which is suitably threaded for that purpose on its upper portion.

The inside diameter of the upper and tubular portion of the driving sleeve 7 is somewhat larger than the diameter of the body 1 whereby a clearance is established between the body 1 and the sleeve 7 which clearance permits the sleeve 7 to float on the body 1. Substantially this same amount of clearance should be provided between the ring 36 and the collar 5 and the body 1.

The driving sleeve 7 has the partition 8 which has the square and taper opening 9. The lower portion of the driving sleeve 7 has the slots 10, preferably three as shown, which retain and drive the rolls 11. Intermediate both ends of the sleeve 7 is the collar 12 over which fits the roll engaging ring 13 as best seen in Fig. I. The lower portion of the ring 13 terminates into the retainer portion 14.

In the openings 4 and 9 fits the driving plug 15 which is substantially square and has both ends tapered, the angle of which taper is less than the angle of the taper in the openings 4 and 9 as best seen in Fig. I.

The rolls 11 are cylindrical in form and have the ends chamfered as shown, and are, preferably, hardened.

Against the surfaces 3 and 16 lie the plates 17 and 18 which are, preferably, hardened and ground, and between the plates 17 and 18 are the antifriction balls 19. The plates 17 and 18 and the balls 19 forming a thrust-bearing.

The collet 20 has the opening 21 of any suitable form to receive a tool shank, and further has three notches 22 which are adapted to engage the rolls 11. It is preferred that the collet 20 fit slidingly into the lower portion of the sleeve 7 although some clearance or play there will not be a disadvantage in most cases.

The object of the several members so far described and the assembly thereof is as follows:

The body 1 is to be driven by any suitable means which body 1 drives the sleeve 7 through the square ended plug 15; the ring 36 supports the sleeve 7, in order to reduce friction and provide for economical operation of the chuck, the ball thrust bearing is introduced between the body 1 and the partition 8; the rolls 11 lie in the slots 10 and engage the notches 22 when the sleeve 13 is in the position shown in Fig. I, but when the sleeve 13 is in the position shown in Fig. III, the rolls 11 are forced outward by means of the weight of or the pull on the collet 20 and the chamfered ends on the rolls 11 and the bevel ends of the notches 22, at which time the rolls 11 no longer engage the notches 22 and the tool or collet may readily be removed from the chuck.

The clearances shown between the several members is for the purpose of permitting the collet or tool to float in the chuck and the driving plug 15 is for the purpose of establishing a flexible driving connection between the body 1 and the sleeve 7 for which purpose the openings 4 and 9 are made of a different contour than the ends of the plug 15.

The operation of this particular chuck is as follows: Starting from the position of the sleeve 13 as shown in Fig. III where it is in its upper position and the rolls 11 are in their outer position, the collet 20 is inserted into the sleeve 7; the sleeve 7 is then moved downwardly whereby the rolls 11 are forced inwardly due to the beveled shoulder between the body of the sleeve 13 and the retainer portion 14; when the sleeve 13 is so moved down, the rolls 11 will engage the notches 22 as seen in Fig. I whereupon the collet 20 will rotate with the sleeve 7 which is driven by the body 1 through the plug 15. In order to remove the collet 20, the sleeve 13 is moved upwardly whereupon the weight of the collet 20 will force the rolls 11 outwardly against the inner wall of the retainer portion 14 due to the beveled ends of the notches 22 and the beveled ends of the rolls 11; the collet 20 can now be readily removed from the chuck and the position of the several members will be as seen in Fig. I which was the starting point.

It will be seen that, with this arrangement, the collet can be inserted and removed while the chuck is rotating and that considerable time can be saved thereby. A further advantage being that the collet can float in the body.

The modification shown in Fig. IV provides no float for the collet, is therefore cheaper of manufacture and repairs and answers very well for many purposes. The general construction of this modification is similar to that shown in Fig. I except that no floating means is provided.

In this particular construction I prefer to form the body 23 with a suitable shank 24, with the opening 25 to receive a collet, with the slots 26 to receive the driving rolls 27, and with the collar 28 which supports the sleeve 29.

The collet 30 fits slidingly into the opening 25 and has the notches 31 whereby the collet 30 is driven.

The general construction and operation of this modification is thought to be obvious since it is very similar to that shown and described in connection with Figs. I, II, and III.

In the modification shown in Fig. V the collet is omitted and the driving rolls engage the tool directly which, in this case, is a taper shank tool.

In this particular instance, the body and sleeve are similar to the construction heretofore shown and described, but the driving rolls 32 are tapered to suit the taper on the tool shank, the longitudinal axes of the rolls 32 are inclined in relation with the longitudinal axis of the chuck, and the notches 33 on this tool shank are in line with the taper of the shank and not with the longitudinal axis of the tool.

The rolls 32, could of course, be straight, in which case the notches on the tool shank should be cut in line with the longitudinal axis of the tool.

The remainder of elements for this modification are similar to those heretofore shown and described and it is thought that the construction and operation of this particular modification is obvious.

It is thought obvious now that my invention provides a comparatively inexpensive and efficient tool which may float to compensate for nonalinement of machinery and work operated upon, that such float is not merely a wiggle of the tool as is now in common use but is a float in which the tool moves or floats bodily and into alinement and does not permit the outer end of the tool to move considerably more than the inner end which is an important and very advantageous factor, particularly in automatic machinery, etc., where it was necessary that the old style floating tool be guided when it first enters a hole in order to prevent frequent breakage of that tool; that considerable time can be saved with this chuck since tool changes may be made while the machine is running; and that there are no dangerous projections or elements on the outside of this chuck whereby an operator may be injured.

Since many modifications of this invention are possible, two of them have been pointed out in this specification and drawings, but it is thought that the drawings and description given are sufficient to fully show my invention. Therefore, without limiting myself to the particular construction and arrangement shown and described, I claim:

1. An apparatus of the character described having one or more rolls the longitudinal axes of which are parallel with the longitudinal axis of the apparatus and which are confined within a longitudinally slidable case and which are adapted to establish and disestablish a driving connection between a driving and a driven member.

2. An apparatus of the character described having a body, a tubular portion at one end of the body, one or more slots in the wall of the tubular portion, rolls in the slots and having their longitudinal axes parallel with the longitudinal axis of the apparatus, and a sleeve over the tubular portion and over the rolls which sleeve being adapted to move the rolls into and out of engagement with member to be driven.

3. An apparatus of the character described having a body, a driving sleeve floatingly secured to the body, a flexible driving member between the body and the sleeve, one or more slots in the sleeve, a driving member in each slot, a sliding sleeve over the driving sleeve and over the driving members, and the sliding sleeve adapted to force the driving members into and out of engagement with the driving sleeve and the apparatus to be driven.

4. An apparatus of the character described having a body, a driving sleeve floatingly secured to the body, a flexible driving connection between the body and the driving sleeve, an antifriction bearing between the body and the driving sleeve, one or more slots in the driving sleeve, a driving member in each slot, a sliding sleeve over the driving sleeve and over the driving members, and the sliding sleeve adapted to force the driving members into and out of engagement with the driving sleeve and the apparatus to be driven.

5. An apparatus of the character described having a driving sleeve, a plurality of openings in the driving sleeve, a driving roll in each opening, the rolls beveled at each end, and a sliding sleeve over the rolls and adapted to retain the same in their outer or disengaging position when in its upper position and to force them into engaging position when in its lower position.

6. An apparatus of the character described having a body, a driving sleeve floatingly mounted on the body, a plurality of openings in the driving sleeve, a driving roll in each opening, the driving rolls beveled at each end, a flexible driving connection between the body and the driving sleeve, and a sliding sleeve over the rolls and adapted to retain the same in their outer or disengaging position when in its upper position and to force the rolls into engaging position when in its lower position.

CHRISTIAN F. HEINKEL.

Witnesses:
WILLIAM G. LUETERS,
OSCAR F. DEAN.